(12) United States Patent
Iwauchi (10) Patent No.: US 10,289,370 B2
(45) Date of Patent: May 14, 2019

(54) IMAGE PROCESSING APPARATUS, CONTROL METHOD, AND STORAGE MEDIUM FOR MULTIPLE PROCESSING REQUESTS

(71) Applicant: CANON KABUSHIKI KAISHA, Tokyo (JP)

(72) Inventor: Nobuyuki Iwauchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/463,832

(22) Filed: Mar. 20, 2017

(65) Prior Publication Data

US 2017/0277497 A1 Sep. 28, 2017

(30) Foreign Application Priority Data

Mar. 25, 2016 (JP) ................ 2016-061612

(51) Int. Cl.
*G06F 3/12* (2006.01)
*H04N 1/00* (2006.01)

(52) U.S. Cl.
CPC .......... *G06F 3/1294* (2013.01); *G06F 3/1205* (2013.01); *G06F 3/1236* (2013.01); *G06F 3/1284* (2013.01); *G06F 3/1287* (2013.01); *H04N 1/00127* (2013.01)

(58) Field of Classification Search
CPC .... G06F 3/1294; G06F 3/1205; G06F 3/1287; G06F 3/1236
See application file for complete search history.

(56) References Cited

U.S. PATENT DOCUMENTS

| | | | | |
|---|---|---|---|---|
| 7,634,572 B2* | 12/2009 | Nanduri | ................ | H04L 63/166 709/219 |
| 2002/0085228 A1* | 7/2002 | Yagita | .................. | G06F 3/1205 358/1.15 |
| 2003/0160997 A1* | 8/2003 | Kimura | ................. | G06F 3/1219 358/1.15 |
| 2006/0195687 A1* | 8/2006 | Klein | .................. | H04L 63/0428 713/150 |
| 2006/0293765 A1* | 12/2006 | Tanaka | ............... | H04N 1/00408 700/15 |
| 2014/0063544 A1* | 3/2014 | Kadota | ................. | G06F 13/385 358/1.15 |
| 2014/0122733 A1* | 5/2014 | Kadota | ................. | G06F 21/608 709/228 |

(Continued)

FOREIGN PATENT DOCUMENTS

JP 2013-219568 A 10/2013

*Primary Examiner* — Ming Y Hon
(74) *Attorney, Agent, or Firm* — Canon U.S.A., Inc. IP Division (57) ABSTRACT

In a case where it is determined that an HTTP request has been received via an IPP printing port, an image processing apparatus transmits a first HTTP response for permitting transmission of print data to an information processing apparatus. On the other hand, in a case where it is determined that an HTTP request has been received via a port different from the IPP printing port, the image processing apparatus transmits a second HTTP response including data regarding a remote screen for enabling the information processing apparatus to manage the image processing apparatus to the information processing apparatus.

24 Claims, 7 Drawing Sheets

(56) References Cited

U.S. PATENT DOCUMENTS

2014/0211248 A1* 7/2014 Uchikawa ............. G06F 3/1287
  358/1.15
2015/0293729 A1* 10/2015 Sako ..................... G06F 3/1229
  358/1.15

* cited by examiner

FIG. 1A

```
POST /request/url HTTP/1.1                                          ← REQUEST LINE Host: 192.168.1.100
Connection: Close                                                   ← HEADER
Content-Type: text/xml
Content-Length: 436
                                                                    ← BLANK LINE <?xml version="1.0" encoding="utf-8"?>
<scan: xmlns:scan="http://xxx.xxx.xxx.xxx/sample/scan/spec">
  <scan:Request>
    <scan:Info>
      <scan:UserName>TestUser</scan:UserName>
      <scan:Command>PullScanRequest</scan:Command>
    </scan:Info>                                                    ← BODY
  </scan:Request>
  <scan:Job>
    <scan:Resolution>300</scan:Resolution>
    <scan:Width>8500</scan:Width>
    <scan:Height>21600</scan:Height>
  </scan:Job>
</scan:Request>
```

FIG. 1B

```
HTTP/1.1 200 OK                                                     ← STATUS LINE

Server: WebServer
Connection: Close                                                   ← HEADER
Content-Type: text/xml
Content-Length: 306
                                                                    ← BLANK LINE <?xml version="1.0" encoding="utf-8"?>
<scan: xmlns:scan="http://xxx.xxx.xxx.xxx/sample/scan/spec">
  <scan:Response>
    <scan:Info>
      <scan:Command>PullScanResponse</scan:Command>
    </scan:Info>
  </scan:Request>                                                   ← BODY
  <scan:Job>
    <scan:JobId>1</scan:JobId>
    <scan:ScanDataURL>http://192.168.1.100/scanjob/1</scan:ScanDataURL>
  </scan:Job>
</scan:Request>
```

IMAGE PROCESSING APPARATUS, CONTROL METHOD, AND STORAGE MEDIUM FOR MULTIPLE PROCESSING REQUESTS

BACKGROUND

Technical Field

The present disclosure relates to an image processing apparatus including a communication interface, a control method, and a storage medium.

Description of the Related Art

In recent years, there has been the development of a standard for using, in universal serial bus (USB) communication, a communication protocol previously used in a TCP/IP network. This standard is called USB Print Interface Class IPP Protocol Specification (hereinafter referred to as IPP USB Specification). With the IPP USB Specification, a hypertext transfer protocol (HTTP) used for the transmission/receipt of content including HTML can be used in USB communication. In addition, an internet printing protocol (IPP), which is used for the exchange of print data or the like between a printer and a computer, can also be used in USB communication. Japanese Patent Laid-Open No. 2013-219568 discloses print processing using the IPP.

However, Japanese Patent Laid-Open No. 2013-219568 does not take a case where an image processing apparatus receives both a request for print processing using the IPP and a request for another processing into consideration.

SUMMARY

The present disclosure provides an image processing apparatus capable of appropriately identifying print processing using the IPP and another processing from each another and performing the identified processing.

The present disclosure provides an image processing apparatus capable of communicating with an information processing apparatus. The image processing apparatus includes a transmission unit configured to transmit a first HTTP response for permitting transmission of print data to the information processing apparatus when receiving a first HTTP request from the information processing apparatus via an Internet Printing Protocol (IPP) printing port using the IPP and transmit a second HTTP response including data regarding a remote screen for enabling the information processing apparatus to manage the image processing apparatus to the information processing apparatus when receiving a second HTTP request from the information processing apparatus via a port different from the IPP printing port, and a print unit configured to perform print processing on the basis of print data that has been received in response to transmission of the first HTTP response.

Further features of the present invention will become apparent from the following description of exemplary embodiments with reference to the attached drawings.

DESCRIPTION OF THE EMBODIMENTS

Embodiments of the present invention will be described below with reference to the accompanying drawings. In the following embodiments, a multifunction peripheral (MFP) is used as an example of an image processing apparatus. However, an image processing apparatus according to an embodiment of the present invention is not limited to an MFP, and may be, for example, a printer or scanner. In the following embodiments, an MFP is connected to an information processing apparatus (for example, a terminal device such as a PC or a tablet) via a TCP/IP network interface and a USB communication interface. This terminal device performs printer control such the making of a print request using the HTTP a hypertext transfer protocol secure (HTTPS).

[First Embodiment]

It is specified in the IPP USB Specification that an IPP command request is transferred at an endpoint for bulk-out transfer of a USB print class interface, and that an IPP command response is transferred at an endpoint for bulk-in transfer of the USB print class interface. In addition, it is specified in the standard that a command request is received and a command response is transmitted also with the HTTP in a manner similar to that of the IPP.

Similar communication control can be performed for basic HTTP data transmission/receipt without making a user aware of the difference between communication interfaces such as a TCP/IP network and a USB. A Web server or a communication apparatus that has received an HTTP request from an information processing apparatus such as a PC or a tablet performs processing in response to the request, and then transmits an HTTP response to the information processing apparatus as a result of the processing. The communication between the information processing apparatus and the Web server or the communication apparatus can be similarly controlled irrespective of whether a communication interface is the TCP/IP network or the USB.

However, in a case where received data cannot be temporarily processed because of another factor, the communication needs to be controlled in accordance with a communication interface. An HTTP request and an HTTP response are sometimes merely referred to as "request" and "response", respectively.

In order to describe the necessity to control communication in accordance with a communication interface, an outline of HTTP communication will be described.

Figure 1A:
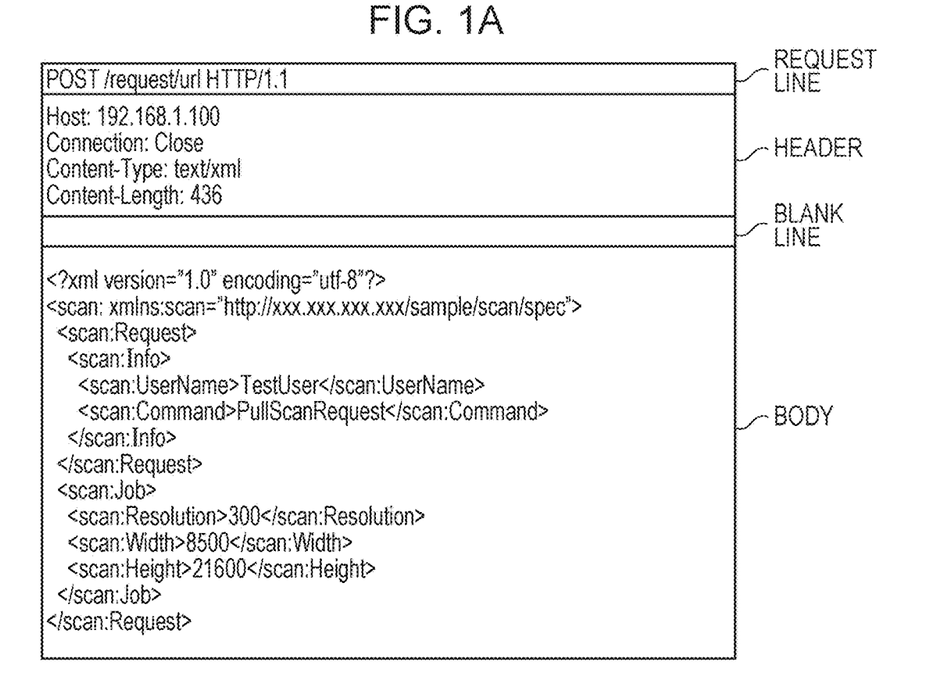
FIGS. 1A and 1B are schematic diagrams describing HTTP communication.

The configuration of an HTTP request is as illustrated in FIG. 1A. An HTTP request includes a request line, a header, a blank line, and a body. The request line includes a method region ("POST" in the drawing) indicating a method of processing the HTTP request, a request path region ("/request/url" in the drawing) indicating a URL where processing is performed, and a version of the HTTP ("HTTP/1.1" in the drawing).

The header includes regions for describing information regarding the body, for example, information indicating a data length of the body ("Content-Length" in the drawing) and information indicating a data format of the body ("Content-type" in the drawing).

The blank line indicates a border between the header and the body. The body is used to specify details of processing of the HTTP request. There may be a case where the body is needed and a case where the body is not needed depending on the HTTP request.

Figure 1B:
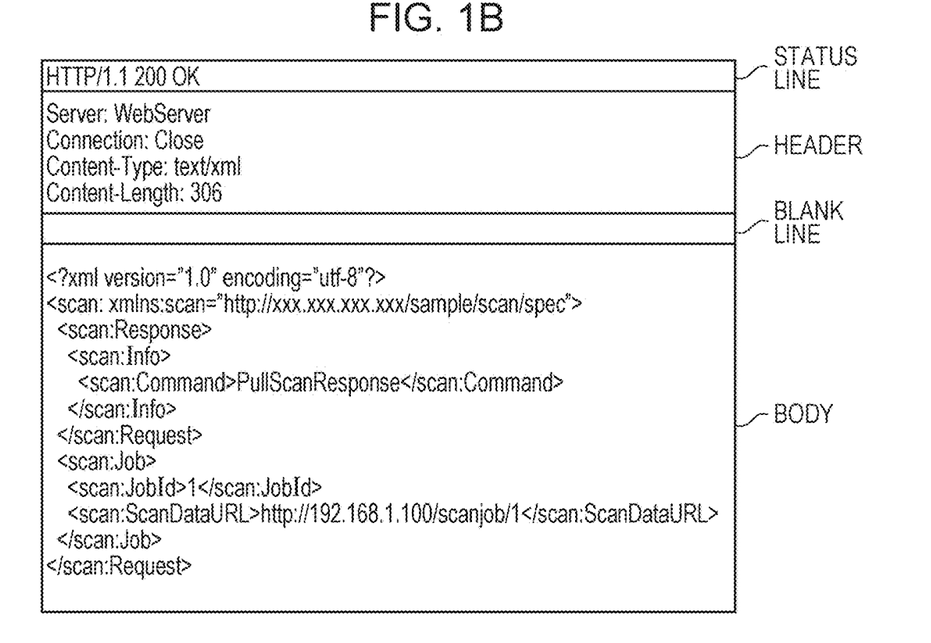

The configuration of an HTTP response is as illustrated in FIG. 1B. An HTTP response includes a status line, a header, a blank line, and a body. The status line includes a version of the HTTP and a status code ("200 OK" in the drawing) indicating a result of acceptance of the request.

As with the HTTP request, the header includes a region for describing information regarding the body. In a case where there is any data to be included in a response as a result of the HTTP request acceptance processing, the body is used as a region for storing the data. For example, when a predetermined page of the Internet is viewed from a browser of a PC via a Web server, an HTTP request (method: GET, request path: index.html) is transmitted from the browser to the Web server. The Web server transmits an HTTP response (status code: 200 OK, body: predetermined page data described in HTML) as a response of the HTTP request. The browser analyzes the received HTML data and displays a page as a result of the analysis.

The HTTP is used not only for the request for acquisition of an HTML document, which is notably made by a Web browser, but also as a printing or scan protocol such as the IPP or the Web Service for Devices (WSD) from the viewpoint of its versatility. The HTTP is provided not only in Web servers but also in image processing apparatuses such as an MFP, and is thus widely used as a communication protocol with which various usage patterns are realized. There is a method of realizing more secure data communication using the HTTPS as compared with data communication using the HTTP. Also in the IPP, IPP communication using the HTTPS is standardized. Accordingly, communication at the time of transmission of an HTTP request to a Web server needs to be controlled so that the selection of a path and processing can be appropriately performed. As described above, the IPP is an abbreviation for "Internet Printing Protocol".

In this embodiment, processing performed when an MFP receives an IPP request from a terminal device will be described.

Figure 2:
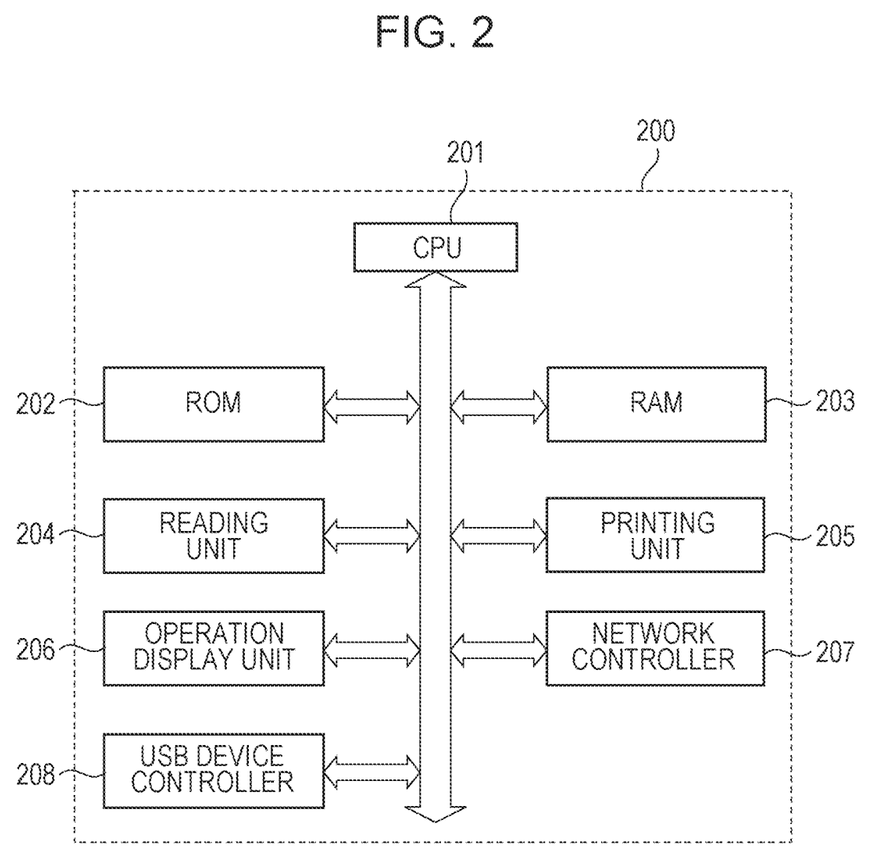
FIG. 2 is a hardware block diagram of a multifunction peripheral (MPF).

FIG. 2 is a diagram illustrating a network according to an embodiment of the present invention and a USB-compatible MFP.

A CPU 201 performs overall control of an apparatus in accordance with a basic control program written in a Read-Only Memory (ROM) 202. A Random Access Memory (RAM) 203 is used as a work area when a program read from the ROM 202 is executed and a buffer at the time of the transmission/receipt of data. The ROM 202 stores a program for causing a reading unit 204 to perform scanning in accordance with the HTTP. The reading unit 204 reads a document made of paper, film, or the like, placed on a platen glass to generate image data. The reading unit 204 includes a scanner head including a reading sensor having a reading width corresponding to the maximum readable width, and generates image data (scan data) by scanning with the scanner head. A printing unit 205 includes a print head and ink tanks of respective colors, and prints an image on a sheet such as a print sheet by ejecting ink in the ink tanks through the print head. An operation display unit 206 includes keys such as a character input key, a cursor key, an enter key, and a cancel key and a light-emitting diode (LED) or a liquid crystal display (LCD), and allows a user to activate various functions of an MFP or perform various settings of an MFP. The operation display unit 206 may be configured as a touch panel. A network controller 207 is communicably connected to a plurality of apparatuses via a wired LAN such as Ethernet (registered trademark) or a wireless LAN. An MFP 200 may be compliant with a wireless communication method such as WiFi communication, Near Field Communication (NFC), or Blue Tooth Low Energy (BLE). The MFP 200 transmits connection information thereof (the SSID and password of an access point of the MFP 200) to a terminal device using the NFC or the BLD. The terminal device may establish WiFi connection to the MFP using the received connection information. A USB device controller 208 controls communication through a USB interface. In accordance with a USB communication standard, the USB device controller 208 connects to a USB apparatus and controls communication. The components 201 to 208 are interconnected via a CPU bus 209. The MFP 200 includes a single or a plurality of sheet cassettes, and displays a sheet type setting screen on the operation display unit 206 when a user opens the sheet cassette to change a sheet. For example, in a case where a user sets a normal sheet in a sheet cassette, the user selects "normal sheet" using the sheet type setting screen. In a case where a user sets a postcard in a sheet cassette, the user selects "postcard" using the sheet type setting screen. The MFP 200 can determine a sheet type through selection processing performed with the sheet type setting screen. Alternatively, the MFP 200 may determine a sheet type using a sensor.

Figure 3:
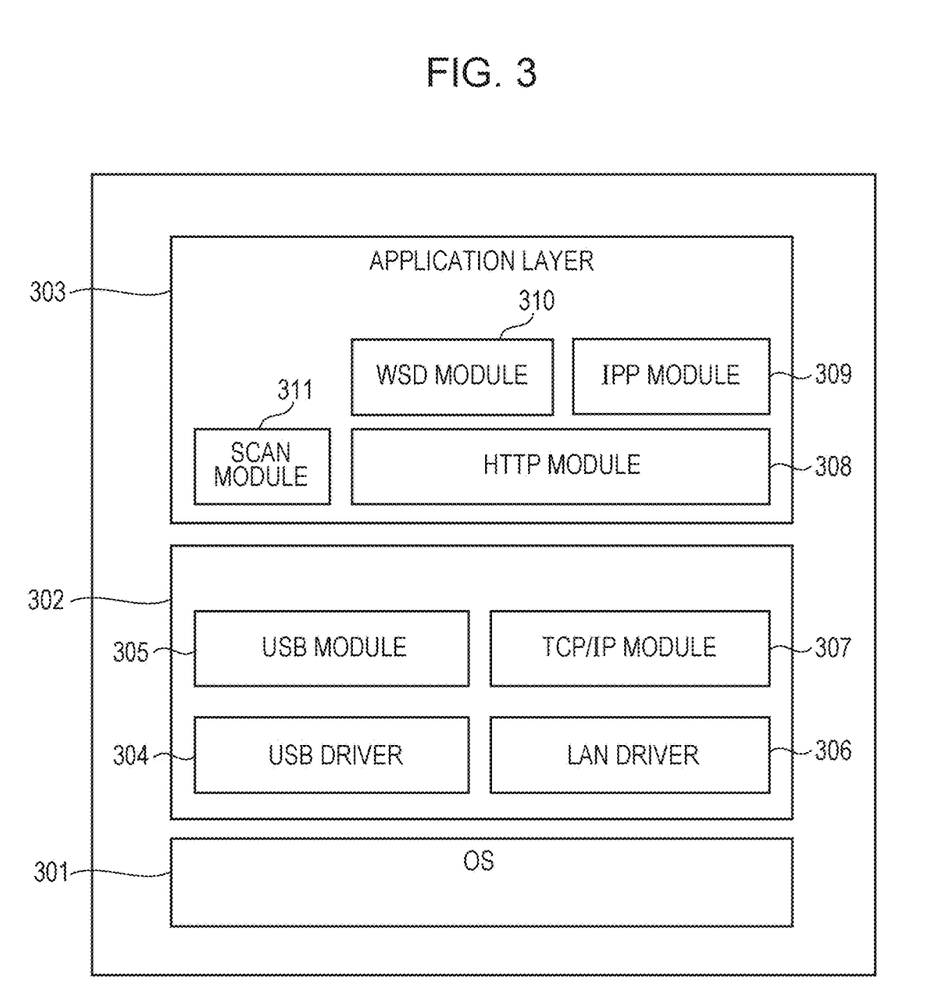
FIG. 3 is a software block diagram of an MPF.

FIG. 3 is a diagram illustrating a module configuration of a program stored in the ROM 202 in the MFP according to an embodiment of the present invention illustrated in FIG. 2. The program is divided into an operating system (OS) 301, a middleware layer 302, and an application layer 303 of the MFP 200. The middleware layer 302 lies between the OS 301 and a group of modules of the application layer 303 and controls communication. A LAN driver 306 and a TCP/IP module 307 which are included in the middleware layer 302 control the network controller 207 to perform TCP/IP communication. A USB driver 304 and a USB module 305 control the USB device controller 208 to perform USB communication. The application layer 303 includes an HTTP module 308, an IPP module 309, a WSD module 310, and a scan module 311. A user can set network information including the IP address of the MFP using the operation display unit 206. A user can also set network information including the IP address of the MFP by accessing the MFP via a network using the Web browser of a terminal device. The HTTP module 308 is used for management as a Web server for setting, and is used for HTTP communication specified by the WSD, the IPP, or other protocols using the HTTP. The HTTP module 308 supports HTTPS communication performed in accordance with the SSL or TLS that is a protocol for a transport layer capable of encrypting data and transmitting/receiving the encrypted data. By the use of HTTPS communication, it is possible to increase the confidentiality of Web content data transmitted through a communication path and control data such as IPP or WSD data. The scan module 311 analyzes data received through USB communication or network communication using the HTTP module 308, the IPP module 309, or the WSD module 310. In a case where the received data is determined to be a scan request through the analysis, the scan module 311 controls execution of scan. In addition, the scan module 311 provides generated scan data to enable the HTTP module 308 to access the scan data. The HTTP module 308 can therefore transmit the scan data upon receipt of a scan data acquisition request from a terminal device.

Figure 4:
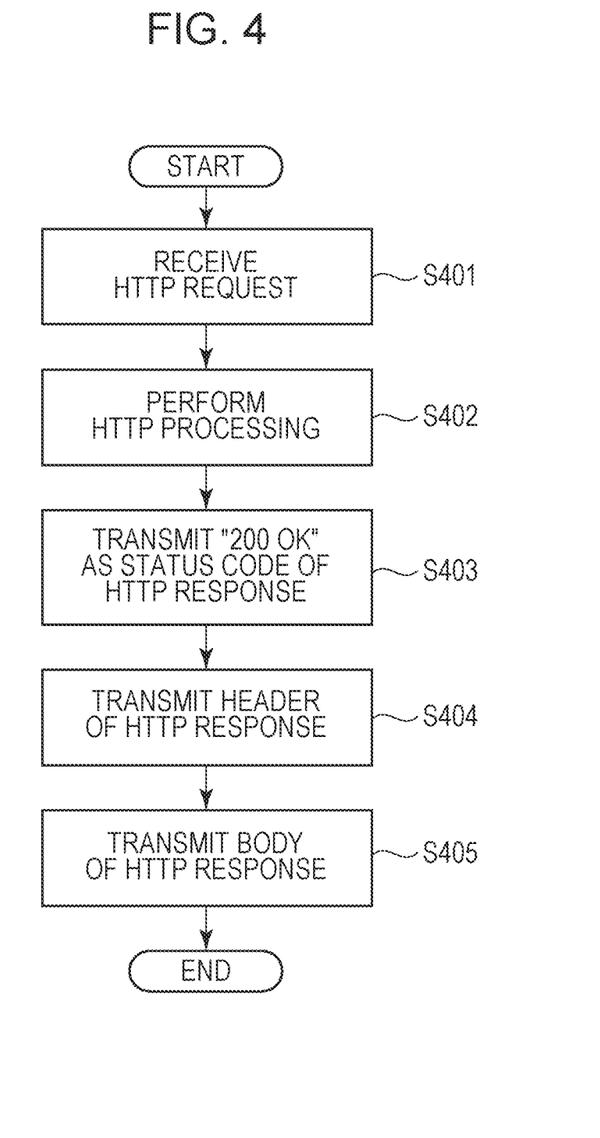
FIG. 4 is a flowchart of a process performed at the time of receipt of an HTTP request.

FIG. 4 is a flowchart illustrating a process of common HTTP communication. The process illustrated in FIG. 4 is performed by causing the CPU 201 to read a program regarding this process from a ROM and execute the read program.

First, the CPU 201 receives an HTTP request from a terminal device connected thereto through network communication or USB communication (S401). Examples of an HTTP request include a content data acquisition request, an IPP print request, a WSD print request, and a scan request. The CPU 201 performs the return of content data, printing, or scanning in accordance with the HTTP request (S402).

After starting processing in accordance with the HTTP request, the CPU 201 sequentially transmits the status code (S403), the header (S404), and the body (S405) as HTTP responses. The status code of the HTTP response may be "200 OK", "201 Created", or any other response numbered in 200s indicating that the request has been normally accepted. The body may include information indicating that the execution of the request has been started. In a case where the CPU 201 cannot receive the request, the CPU 201 makes a response including a status code of "500 Internal Server Error".

Here, an IPP print request will be described. A user uses a terminal device to select a photograph stored in the terminal device and makes an instruction for displaying a menu of operations to be performed for the selected photograph. Upon receiving this instruction, the terminal device displays not only the selected photograph but also other photographs so that the user can make selections. The terminal device also displays operation menus including a menu for the sharing of the selected photograph with another terminal device via BlueTooth (registered trademark), a print menu, and a copy menu for copying of the photograph. In a case where the user selects the print menu, the terminal device displays a printer selection object and an object for selecting the number of print copies. In a case where the user selects the print selection object, the terminal device searches for printers (including an MFP according to this embodiment) that supports IPP printing and displays a list of search results. In a case where the user selects one of printers in the list of search results, the terminal device transmits a request for acquisition of functional information to the selected printer. By making this request, the terminal device acquires functional information about the function of the printer selected by the user. The functional information includes, for example, a sheet size, a sheet type, and a double-sided printing function. The sheet type and the sheet size may be stored in the printer, may be detected by the printer using a sensor, or may be set by a user. In a case where the sheet type and the sheet size are set by a user, settings performed by a user through a sheet setting screen displayed on the operation display unit 206 of the printer are accepted. The sheet setting screen may be displayed when a user makes an instruction for setting a sheet type and a sheet size, when a sheet feed cassette is pulled out, or when the sheet feed cassette is closed.

The terminal device displays a print setting screen on the basis of the functional information acquired from the printer and accepts the selection of print setting information. In a case where the selected printer includes a plurality of sheet feed cassettes, a user sets a sheet type and a sheet size for each of these sheet feed cassettes. Accordingly, in a case where the functional information received by the terminal device includes a plurality of combinations of the sheet type and the sheet size, the terminal device displays a sheet size selection option (or a sheet type selection option) on a print setting screen. In a case where the selected printer includes only one sheet feed cassette, the functional information includes only one combination of the sheet type and the sheet size. The terminal device therefore does not display a sheet size selection option (or a sheet type selection option) on the print setting screen. In a case where the functional information includes the double-sided printing function, the terminal device displays a double-sided printing option on the print setting screen.

In a case where the selection of the print setting information is performed and "print start" is then selected, the terminal device transmits an HTTP request including an IPP print request to the selected printer.

Figure 5:
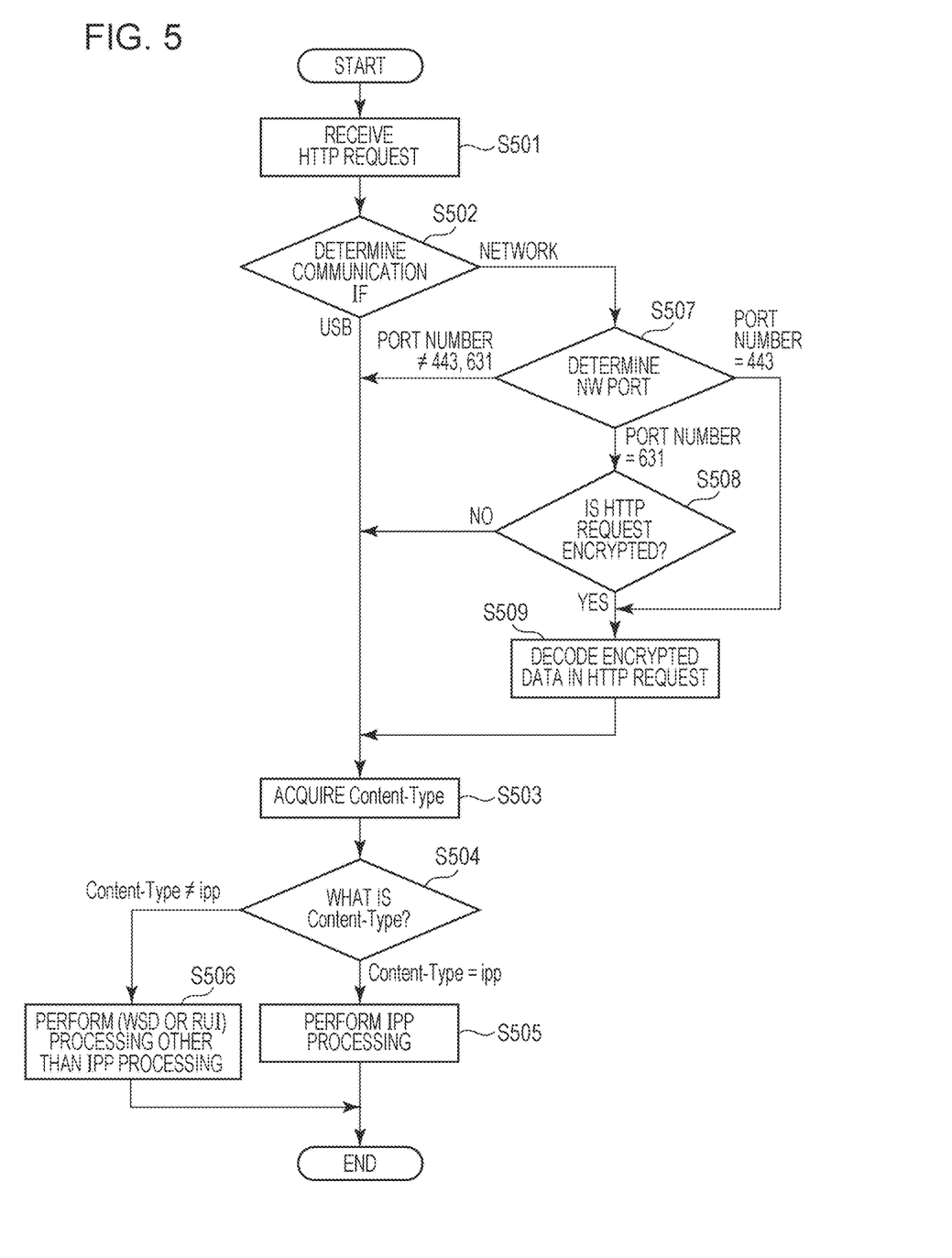
FIG. 5 is a flowchart of a process performed by an MFP according to an embodiment of the present invention when handling an HTTP request.

FIG. 5 is a flowchart illustrating a determination process when an MFP according to an embodiment of the present invention receives an HTTP request. The process illustrated in FIG. 5 is performed by causing the CPU 201 to read a program regarding this process from a ROM and execute the read program.

In step S501, the CPU 201 receives an HTTP request from a terminal device. The HPP request includes "GET" indicating that this request is an acquisition request and the URL of data to be acquired in its request line. This URL varies depending on a request such as an IPP request, a WSD request, or a request for acquisition of content data.

In step S502, the CPU 201 determines whether the HTTP request has been received via a network or a USB. It is determined that the HTTP request has been received via a network, the CPU 201 determines from which network port the HTTP request has been received (S507). In a case where it is determined that the HTTP request has been received via a port that is used to transmit both encrypted data and non-encrypted data, the process of the CPU 201 proceeds to step S508. A port used to transmit both encrypted data and non-encrypted data is, for example, a network port with a port number of 631. In step S508, the CPU 201 analyzes the details of the HTTP request to determine whether the HTTP request is encrypted. Specifically, the CPU 201 analyzes a character string included in the request line of the HTTP request, and determines that the HTTP request is encrypted when a predetermined character string (POST or GET) cannot be acquired.

In a case where it is determined in step S508 that the HTTP request is encrypted, the CPU 201 decodes encrypted data in the HTTP request in step S509.

On the other hand, in a case where the CPU 201 determines in step S507 that the HTTP request has been received via a port that is used to transmit encrypted data, the process of the CPU 201 proceeds to step S509. The port used to transmit encrypted data is, for example, a network port with a port number of 443.

In step S509, the CPU 201 decodes encrypted data. In a case where the CPU 201 determines in step S507 that a port has been used which is different from a port used to transmit both encrypted data and non-encrypted data and a port used to transmit encrypted data, the process of the CPU 201 proceeds to step S503. A port different from a port used to transmit both encrypted data and non-encrypted data and a port used to transmit encrypted data is, for example, a network port with a port number other than 443 and 631.

The CPU 201 acquires Content-Type from the header of the HTTP request in step S503 and determines the value of the Content-Type in step S504. It is determined that the Content-Type is application/ipp, the CPU 201 performs IPP processing in step S505. Specifically, in response to the HTTP request for requesting printing using the IPP, the CPU 201 transmits an HTTP response for permitting print data transmission to an information processing apparatus that is a transmission source of the HTTP request. Subsequently, the CPU 201 receives an HTTP request including print data. The CPU 201 performs print processing on the basis of the print setting information included in the body of the HTTP request received for the first time and the print data included in the body of the HTTP request received for the second time.

Figure 6:
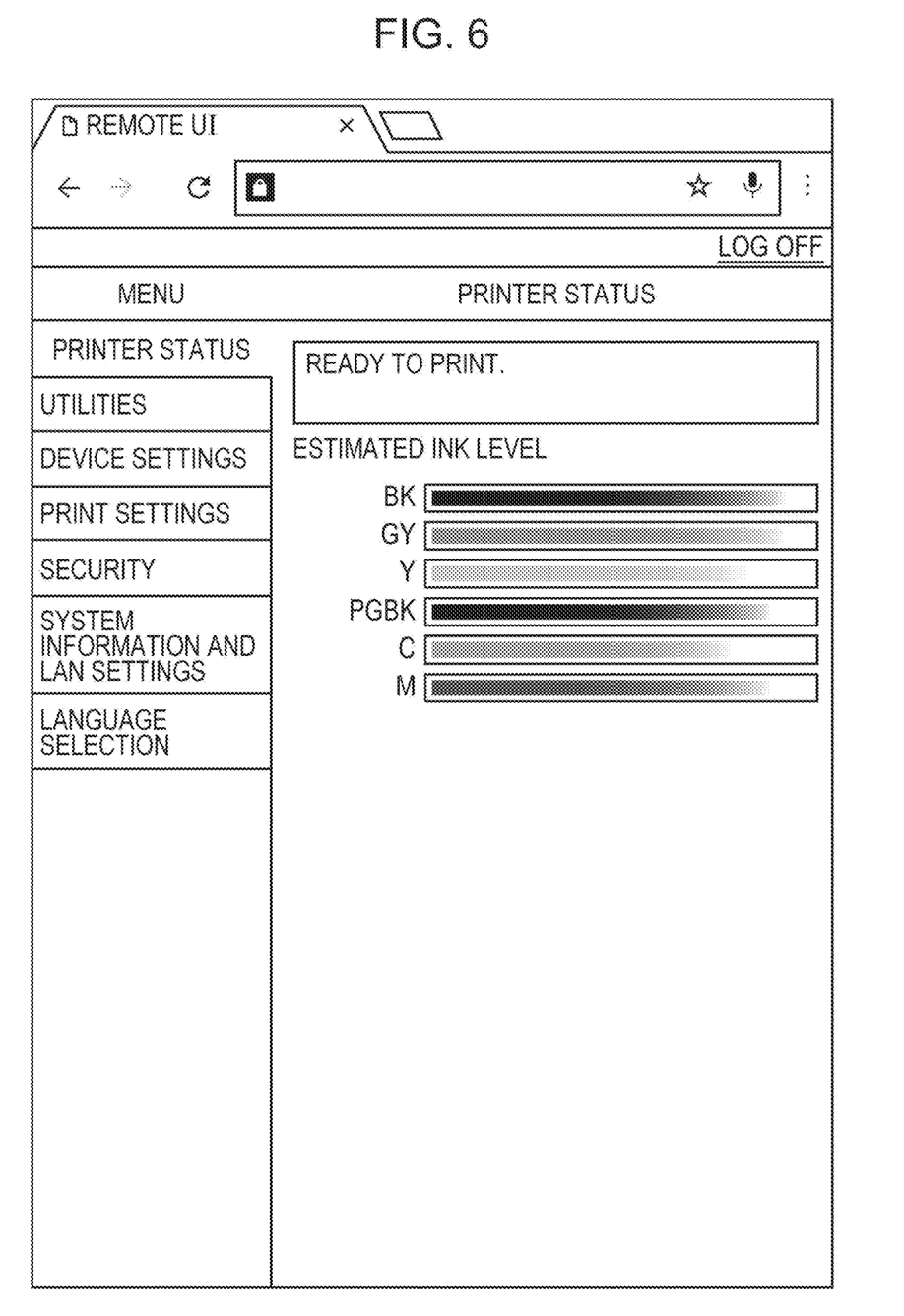
FIG. 6 is a diagram illustrating an example of a remote screen according to an embodiment of the present invention.

On the other hand, it is determined in step S504 that Content-Type is not application/ipp, the CPU 201 performs URL analysis upon the HTTP request in a Web server and performs processing corresponding to a URL in step S506. In the processing of step S506, in a case where the URL included in the HTTP request corresponds to a remote screen, the CPU 201 transmits an HTTP response including HTML data corresponding to the remote screen to an information processing apparatus that is the transmission source of the HTTP request. By performing this processing, the information processing apparatus can display a remote screen (RUI) for remotely controlling an MFP. For example, the information processing apparatus can display a screen illustrated in FIG. 6 on a browser as a remote screen. Using the remote screen, a user of the information processing apparatus can remotely check the state (for example, the amount of ink remaining) of the MFP or make an instruction for the maintenance (nozzle) processing of the MFP. In addition, the user can also set various pieces of information for the MFP using the remote screen.

In the processing of step S506, in a case where the URL included in the HTTP request corresponds to WSD printing, WSD printing is performed. Specifically, in response to the HTTP request for requesting WSD printing, the CPU 201 transmits an HTTP response for permitting print data transmission to an information processing apparatus that is a transmission source of the HTTP request. Subsequently, the CPU 201 receives an HTTP request including print data. The CPU 201 performs print processing on the basis of the print setting information included in the body of the HTTP request received for the first time and the print data included in the body of the HTTP request received for the second time.

Figure 7:
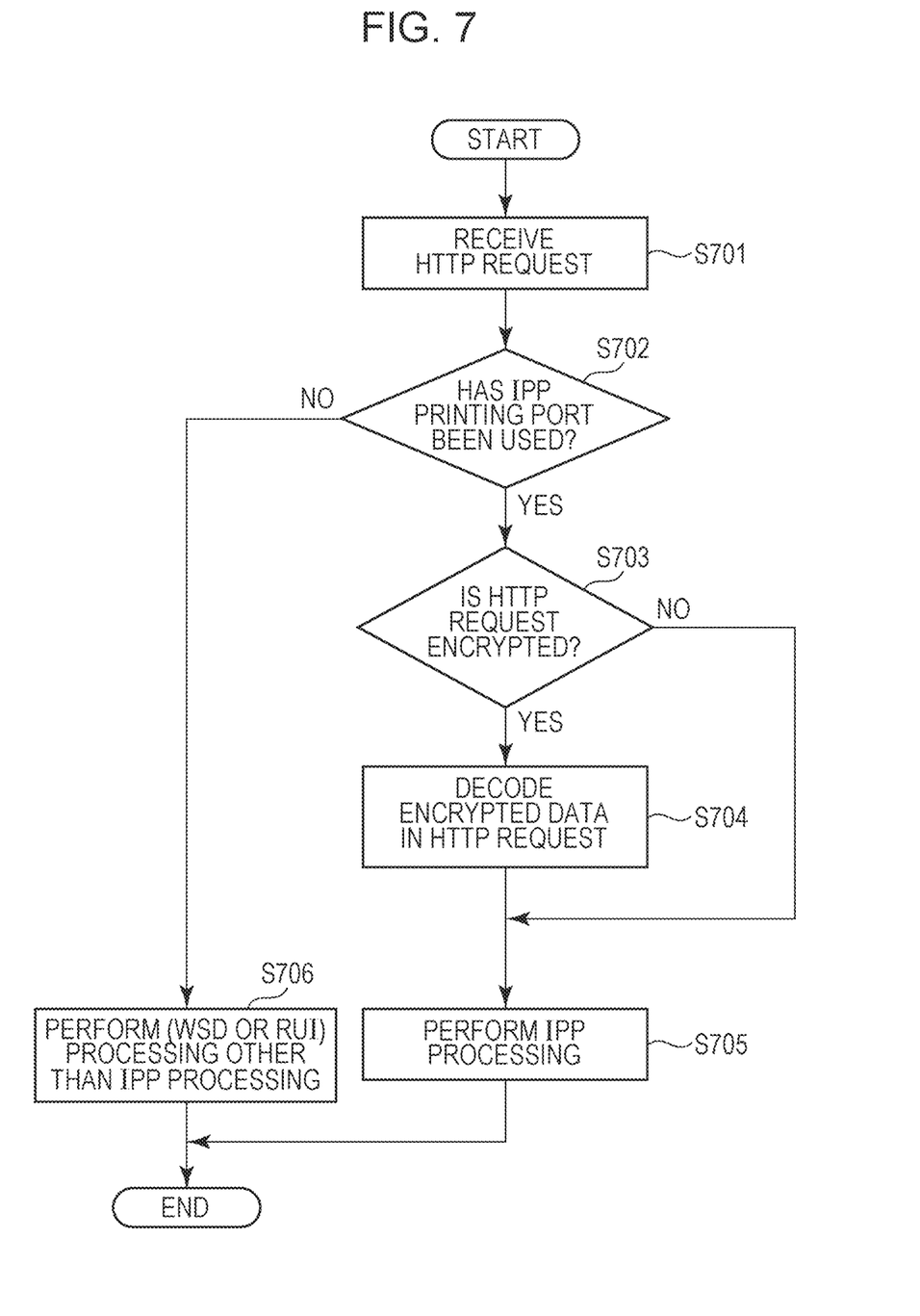
FIG. 7 is a flowchart of a process performed by an MFP according to an embodiment of the present invention when handling an HTTP request.

A method of causing the CPU 201 to determine whether an HTTP request is a request for display of a remote screen or a request for printing using the IPP using a port number will be described with reference to FIG. 7.

In step S701, the CPU 201 receives an HTTP request and determines whether a network port number used for the receipt of the HTTP request indicates a number of a port for printing using the IPP (IPP printing port). An IPP printing port number is stored in advance in a ROM in an MFP. On the basis of this information, the determination processing of step S702 is performed. In a case where it is determined that the network port number is not the number of an IPP printing port (No in step S702), the process of the CPU 201 proceeds to step S706. The processing of step S706 is the same as that of step S506, and the description thereof will be therefore omitted.

On the other hand, in a case where it is determined that the network port number is the number of an IPP printing port (Yes in step S702), the process of the CPU 201 proceeds to step S703. The processing of step S703 is the same as that of step S508, the processing of step S704 is the same as that of step S509, and the processing step S705 is the same as that of step S505. The descriptions thereof will be therefore omitted. In FIG. 7, the CPU 201 may perform the processing of step S503 illustrated in FIG. 5 after step S704 to determine which of the processing of steps S705 and S706 is to be performed.

According to an embodiment of the present invention, it is possible to appropriately identify print processing using the IPP and another processing from each another and perform the identified processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-061612 filed Mar. 25, 2016, which is hereby incorporated by reference herein in its entirety.

What is claimed is:

1. An image processing apparatus capable of communicating with an information processing apparatus, the image processing apparatus comprising:
    a first receiving unit configured to receive a Hypertext Transfer Protocol (HTTP) request via a network;
    a second receiving unit configured to receive a HTTP request via a Universal Serial Bus (USB);
    a decoding unit configured to decode encrypted data corresponding to the HTTP request in a case where the HTTP request received by the first receiving unit is received by using an encryption port for communicating the encrypted data;
    a first transmission unit configured to transmit, to the information processing apparatus, a first response for permitting transmission of print data in a case where the encrypted data is decoded and a content type of the HTTP requests received by using the encryption port indicates a request of printing, a second transmission unit configured to transmit, to the information processing apparatus, a second response regarding a remote screen for enabling the information processing apparatus to manage the image processing apparatus in a case where the encrypted data is decoded and the content type of the second request received by using the encryption port indicates a request of the remote screen; and a print unit configured to perform print processing based on print data that has been received based on transmission of the first response, wherein the first transmission unit transmits the first response in a case where the HTTP request is received via the USB by the second receiving unit and the content type of the HTTP request received by using the USB indicates the request of printing, wherein the second transmission unit transmits the second response in a case where the HTTP request is received via the USB by the second receiving unit and the content type of the HTTP request received by using the USB indicates the request of the remote screen, wherein the network is connected based on connection information being communicated between the image processing apparatus and the information processing apparatus using Bluetooth Low Energy, and wherein the first receiving unit, the second receiving unit, the decoding unit the first transmission unit, the second transmission unit and the print unit are performed by a processor of the image processing apparatus.

2. The image processing apparatus according to claim 1, further comprising:

an encryption determination unit configured to perform determination processing to determine, in a case where the HTTP request has been received via the network, whether the HTTP request is encrypted.

3. The image processing apparatus according to claim 1, wherein the information processing apparatus that has received the second response displays, the remote screen and wherein, on the remote screen, an amount of remaining ink is displayed as a state of the image processing apparatus.

4. The image processing apparatus according to claim 1, wherein the print unit performs print processing based on print setting information included in the HTTP request received via the encrypted port and print data included in an HTTP request received in response to transmission of the first response.

5. The image processing apparatus according to claim 2, further comprising:

a port determination unit configured to determine whether the port receiving the HTTP request is the encryption port or not, wherein the determination processing is not performed in a case where it is determined that the port receiving the HTTP request is the encryption port.

6. The image processing apparatus according to claim 2, further comprising:

a communication determination unit configured to determine that the HTTP request is received via the network or via the USB, wherein the determination processing is not performed in a case where the HTTP request is received via the USB.

7. The image processing apparatus according to claim 1, wherein the encryption port is a port with a port number of 443.

8. The image processing apparatus according to claim 1, further comprising:

a content type determination unit configured to determine the content type of the HTTP request, wherein the first transmitting unit transmits the first response in a case where the content type determination unit determines that the content type is the request of printing, wherein the second transmitting unit transmits the second response in a case where the content type determination unit determines that the content type is the request of the remote screen.

9. A control method for an image processing apparatus capable of communicating with an information processing apparatus, the control method comprising:

receiving a Hypertext Transfer Protocol (HTTP) request via a network;

receiving a HTTP request via a Universal Serial Bus;

transmitting, to the information processing apparatus, a first response for permitting transmission of print data in a case where the encrypted data is decoded and a content type of the HTTP request received by using the encryption port indicates a request of printing:

transmitting, to the information, processing apparatus, a second response regarding a remote screen for enabling the information processing apparatus to manage the image processing apparatus in a case where the encrypted data is decoded and the content type of the HTTP request received by using the encryption port indicates a request of the remote screen; and performing print processing based on print data that has been received based on transmission of the first response, wherein first response is transmitted in a case where the HTTP received via the USB and the content type of the HTTP request received by the USB indicates the request of printing, wherein the second response is transmitted in a case the HTTP request is received via the USB by the second receiving unit and the content type of the HTTP request received by using the USB indicates the request of the remote screen.

10. The control method according to claim 9, further comprising:

determining, as a third determination when it is determined that the HTTP request has been received from the network, whether the HTTP request received from the network is encrypted; and decoding, when it is determined that the HTTP request is encrypted, the encrypted HTTP request.

11. The control method according to claim 9, wherein the second response is configured to cause, in the information processing apparatus that has received the second response, a remote screen for enabling the information processing apparatus to manage the image processing apparatus to be displayed, and wherein, on the remote screen, a state of the image processing apparatus is displayed.

12. The control method according to claim 9, wherein performing print processing is based on print setting information included in the HTTP request received via the first port and print data included in an HTTP request received in response to transmission of the first response.

13. The control method according to claim 9, wherein transmitting includes transmitting, to the information processing apparatus, the first response for permitting transmission of print data when the first determination determines that the HTTP request is received from the information processing apparatus via the first port and the second determination determines that the content type of the HTTP request indicates a request for printing.

14. The control method according to claim 9, further comprising:
   determining whether the port receiving the HTTP request is the encryption port or not,
   wherein the determination processing is not performed in a case where it is determined that the port receiving the HTTP request is the encryption port.

15. The control method according to claim 9, further comprising:
   determining that the HTTP request is received via the network or via the USB,
   wherein the determination process is not performed in a case where the HTTP request is received the USB.

16. The control method according to claim 9, wherein the encryption port is a port with a port number of 443.

17. The control method according to claim 9, further comprising:
   determining the content type of the HTTP request,
   transmitting the first response in a case where it is determined that the content type is the request of printing, and
   transmitting the second response in a case where it is determined that the content type is the request of remote screen.

18. A method for an image processing apparatus capable of communicating with an information processing apparatus comprising:
   receiving, via wireless connection, a request in accordance with a protocol used for communication of HTML;
   decoding encrypted data corresponding to the request in a case where the request is received by using an encryption port for communicating the encrypted data; and
   transmitting, to the information processing apparatus, information regarding a remote screen for enabling the information processing apparatus to manage the image processing apparatus in a case where the encrypted data is decoded and the request received by using the encryption port indicates a request of the remote screen,
   wherein the remote screen including ink information is displayed by the information processing apparatus, and
   wherein the wireless connection between the image processing apparatus and the information processing apparatus is established based on connection information being communicated between the image processing apparatus and the information processing apparatus using Bluetooth Low Energy.

19. The control method according to claim 18, wherein the protocol is a hypertext transfer protocol (HTTP) or hypertext transfer protocol secure (HTTPS).

20. The control method according to claim 18, wherein the encryption port is a port with a port number of 443.

21. The control method according to claim 18, wherein the encryption port is a port with a port number of 631.

22. The control method according to claim 18, the connection information is an SSID.

23. The control method according to claim 18, the connection information is a password related to an access point.

24. The control method according to claim 18, wherein the remote screen is displayed by using a Web browser of the information processing apparatus.

* * * * *